United States Patent Office 2,865,946
Patented Dec. 23, 1958

2,865,946

PESTICIDAL PHOSPHORUS ESTERS

Joe R. Willard and John F. Henahan, Middleport, N. Y., assignors to Food Machinery and Chemical Corporation, New York, N. Y., a corporation of Delaware No Drawing. Application July 16, 1956
Serial No. 597,890

11 Claims. (Cl. 260—461)

This invention relates to novel pesticidal compositions, and particularly to compositions which are useful as insecticides, acaricides and ovicides. More specifically, it has been discovered that compounds of the class of phosphoric esters which includes the bis(S-(dialkoxyphosphinothioyl)mercapto)cycloalkanes possess unique pesticidal activity, in that they function as effective ingredients in insecticidal compositions, acaricidal compositions and ovicidal compositions. The subject compounds have the general formula

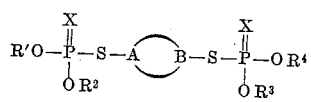

wherein X is oxygen or sulfur; R', R$^2$, R$^3$ and R$^4$ are organic radicals; and A and B are hydrocarbon radicals which form an alicyclic ring.

A large variety of esters of the type described, heretofore unavailable, may be prepared from a dihalide having the general formula

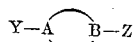

wherein Y and Z may be chlorine or bromine. The ring AB may be a saturated or unsaturated hydrocarbon ring, and may be substituted or unsubstituted.

In preparing the compounds of this invention, the alicyclic dihalide is condensed with a metallic salt of a thio- or dithiophosphoric acid, of the formula

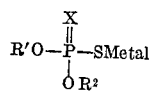

such as the alkali metal and alkaline earth salts and the ammonium and silver salts, generally in the presence of a solvent. The radicals R' and R$^2$ may be hydrocarbon radicals such as alkyl, cycloalkyl or aryl, for example, or they may be substituted hydrocarbons containing such substituents as chloro, bromo, alkoxy, nitro, and the like. Generally R$^3$ and R$^4$ correspond to R' and R$^2$, although they may be different if the reaction is carried out in two stages.

In the preferred process of this invention, two molar equivalents of the appropriate phosphorothioic or -dithioic acid is dissolved in a solvent such as ethanol or dioxane, and a solution of the metal hydroxide is added until the pH is about seven. A 25–40% solution of potassium hydroxide in ethanol is a convenient reagent. A preformed salt of the phosphorus acid may also be used. To the neutral solution is added one molar equivalent of the desired dihalide, and the mixture is heated until the reaction is complete. This generally requires about 3–14 hours under reflux. The product is separated and tested for pesticidal activity.

The following example illustrates the preparation of a typical compound. There are of course modifications which may be successfully employed by those skilled in the art, and which do not depart from the spirit and scope of the invention.

EXAMPLE 1

3,5-bis(S-(diethoxyphosphinothioyl)mercapto)cyclopentene-1

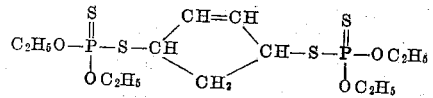

Two molar equivalents of O,O-diethyl hydrogen phosphorodithioate was dissolved in sufficient ethanol to give a four molar solution. Twenty percent ethanolic potassium hydroxide was added slowly, the temperature maintained below 50° C. during the addition, until the pH of the solution was approximately seven. To the neutral solution was added one molar equivalent of 3,5-dichlorocyclopentene-1 and the mixture was refluxed for 2 hours. The precipitated solid was isolated on a filter and the filtrate was concentrated under vacuum. The residue after removing the solvent was diluted with ether, the solution washed with two volumes of water and the ethereal layer dried. The dried solution was concentrated under vacuum to give 0.11 molar equivalent of a brown liquid having $n_{25}D$ 1.5325. Analysis.—Calcd. for $C_{13}H_{24}O_4P_2S_4$: P, 14.26; S, 29.52; P/S ratio, 0.50. Found: P, 14.90; S, 30.80; P/S ratio, 0.50.

A wettable powder formulation of this compound was made containing 25% of the toxicant, 72% Attaclay (fuller's earth) and 3% of an alykyl aryl polyether alcohol. This wettable powder was diluted with water to form an aqueous suspension containing 1250 p. p. m. of toxicant, and was applied by spraying to plant foliage. This formulation exhibited 95% kill of adult and nymph two-spotted mites, as well as ovicidal and residual activity. Against the Mexican bean beetle the percent kill was 45%.

In Table 1 below are described a number of compounds of this invention which have not heretofore been characterized. These compounds may be prepared by procedures similar to that of the foregoing example.

TABLE 1.—BIS(S-(DIALKOXYPHOSPHINOTHIOYL)-MERCAPTO)CYCLOALKANES

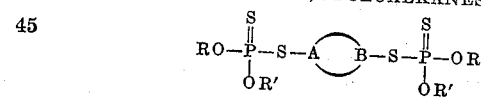

| Compound | | | $n_{25}D$ | Analysis | |
|---|---|---|---|---|---|
| R | R' | AB | | Theory | Found |
| Ethyl | Ethyl | —CH—CH—<br>CH$_2$   CH$_2$<br>CH$_2$—CH$_2$ | 1.5398 | P—13.69 | P—13.92 |
| Do | do | —CH—CH—<br>CH$_2$   CH$_2$<br>CH$_2$—CH(CH$_3$) | 1.5290 | | |
| Do | do | —CH——CH—<br>CH$_2$   CH$_2$<br>CH$_2$ | 1.5273 | P—14.53 | P—14.70 |

The compounds of this invention were evaluated for pesticidal activity. It was found that all were not equivalent in activity, but that some were superior as insecticides, some as acaricides and some as ovicides, and that some showed systemic activity as well. Some of the compounds in this group showed an unusually broad range of activity characterized by high toxicity.

The pesticidal compositions may be formulated as aqueous emulsions, as dry or wettable powders, as solutions, or in any other suitable vehicle. The compositions can be utilized as sprays, as dusts, as aerosol mixtures, insecticidal coating compositions, and as residues. In general, they can be applied by methods commonly used for control or eradication of insects, mites and the like. Thus, these compositions may be formulated with solvents, diluents, and carrier media, adhesives, spreading, wetting and emulsifying agents and other ingredients.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. As a new composition of matter a compound of the formula

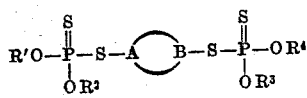

wherein $R'$, $R^2$, $R^3$ and $R^4$ are lower alkyl radicals, and A and B form a ring structure selected from the group of five and six membered aliphatic hydrocarbon rings having at most one double bond.

2. As a new composition of matter the compound 3,5-bis(S - (diethoxyphosphinothioyl)mercapto)cyclopentene-1 of the formula

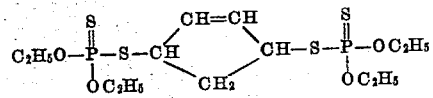

3. As a new composition of matter the compound 1,2-bis(S - (diethoxyphosphinothioyl)mercapto)cyclohexane of the formula

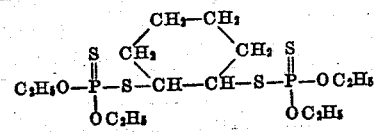

4. As a new composition of matter the compound 1,2-bis(S - (diethoxyphosphinothioyl)mercapto)4 - methyl-cyclohexane of the formula

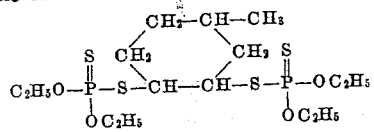

5. As a new composition of matter the compound 1,2-bis(S - (diethoxyphosphinothioyl)mercapto)cyclopentane of the formula

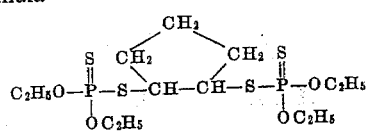

6. A pesticidal composition comprising the compound of claim 1 and an inert pesticidal adjuvant as carrier therefor.

7. A pesticidal composition comprising the compound of claim 2 and an inert pesticidal adjuvant as carrier therefor.

8. A pesticidal composition comprising the compound of claim 3 and an inert pesticidal adjuvant as carrier therefor.

9. A pesticidal composition comprising the compound of claim 4 and an inert pesticidal adjuvant as carrier therefor.

10. A pesticidal composition comprising the compound of claim 5 and an inert pesticidal adjuvant as carrier therefor.

11. A method of controlling pests comprising adding to the infected area a toxic concentration of a compound of claim 1.

References Cited in the file of this patent

UNITED STATES PATENTS 2,266,514   Romieux et al. ---------- Dec. 16, 1941

OTHER REFERENCES

"Hackh's Chemical Dictionary," third edition, The Blakiston Company, Philadelphia (1950).